United States Patent
Martus et al.

[11] Patent Number: 5,936,500
[45] Date of Patent: *Aug. 10, 1999

[54] BI-STABLE SELF-ADJUSTING ACTUATOR MECHANISM

[75] Inventors: Charles R. Martus, Oxford; Charles A. Detweiler, Durand; David L. DeLang, Sterling Heights, all of Mich.

[73] Assignee: Eaton Corporation, Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/878,107

[22] Filed: Jun. 18, 1997

[51] Int. Cl.⁶ ........................................................ H01F 7/00
[52] U.S. Cl. ........................................... 335/229; 335/298
[58] Field of Search ............................... 335/18, 177–180, 335/183, 255, 256, 263, 220, 221, 126, 278, 281, 282, 298, 297

[56] References Cited

U.S. PATENT DOCUMENTS

| | | | |
|---|---|---|---|
| 3,683,239 | 8/1972 | Sturman | 335/179 |
| 4,443,775 | 4/1984 | Fujitani et al. | 335/281 |
| 4,679,017 | 7/1987 | Mishler et al. | 335/164 |
| 4,758,811 | 7/1988 | Slavin . | |
| 4,947,968 | 8/1990 | Slavin et al. | 335/255 |
| 5,044,678 | 9/1991 | Detweiler . | |
| 5,076,622 | 12/1991 | Detweiler . | |
| 5,453,724 | 9/1995 | Seymour et al. | 335/177 |
| 5,563,756 | 10/1996 | Ignasiak | 335/18 |

*Primary Examiner*—Lincoln Donovan
*Attorney, Agent, or Firm*—Roger A. Johnston

[57] ABSTRACT

An electrically operated actuator mechanism for remote locking and unlocking of a door. The moveable bolt is coupled to a solenoid armature for movement in a guide which is registered against the door in the closed position. The solenoid coil bobbin is stationary and the pole frame including a magnet, bolt guide and bolt are slidable thereon for locating the bolt guide against the door at installation. A spring biases the bolt into engagement with the door. Upon coil energization in one direction, the magnetic flux of the coil and magnet are sufficient to move the armature and retract the bolt unlocking the door. Upon de-energization of the solenoid coil the magnet holds the armature and bolt in the unlocked position. Upon subsequent re-energization of the coil in the opposite direction, the magnet flux is neutralized and the spring returns the armature and bolt to the locked position. The actuator is particularly suitable for automotive fuel filler access door locking/unlocking applications.

8 Claims, 4 Drawing Sheets

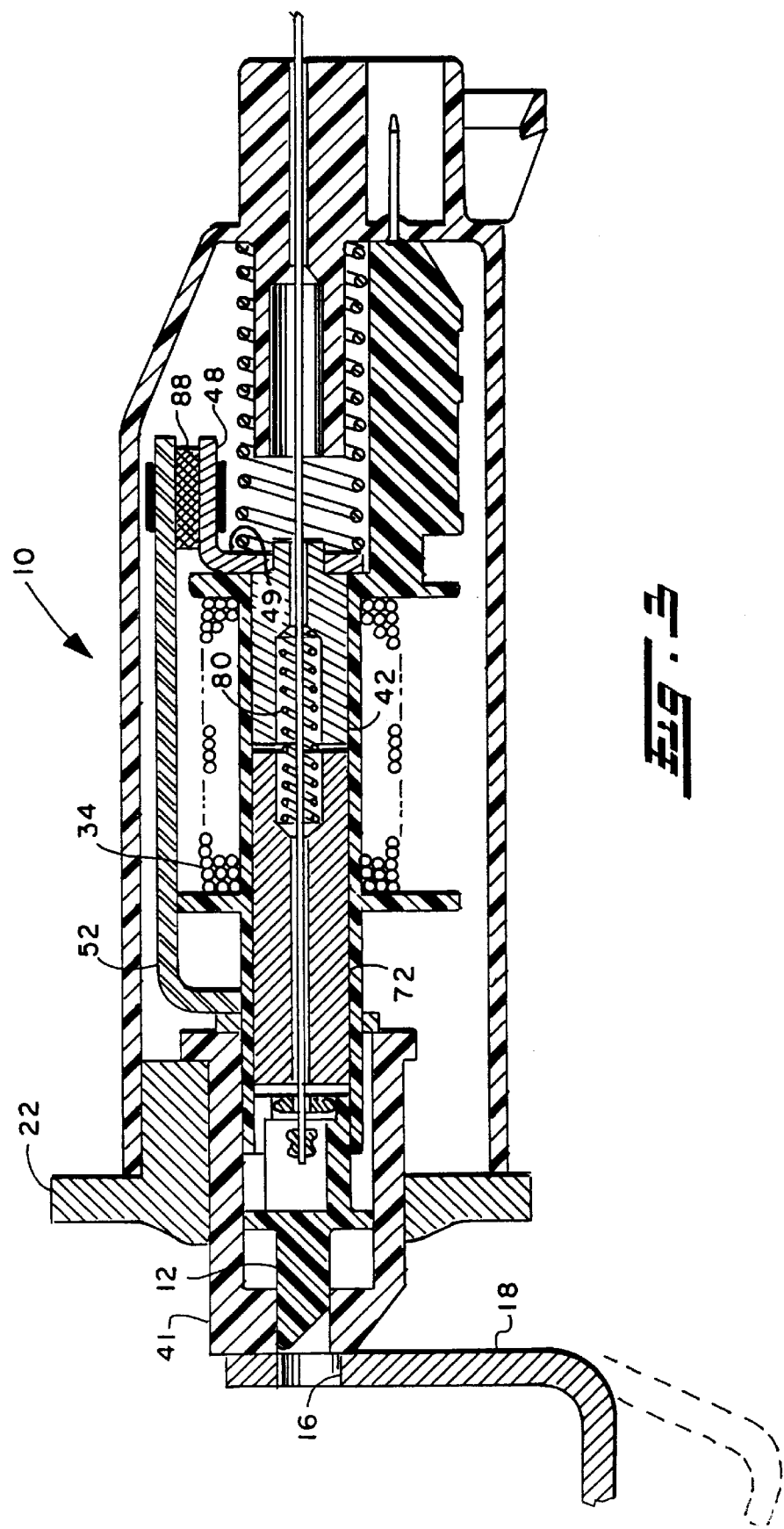

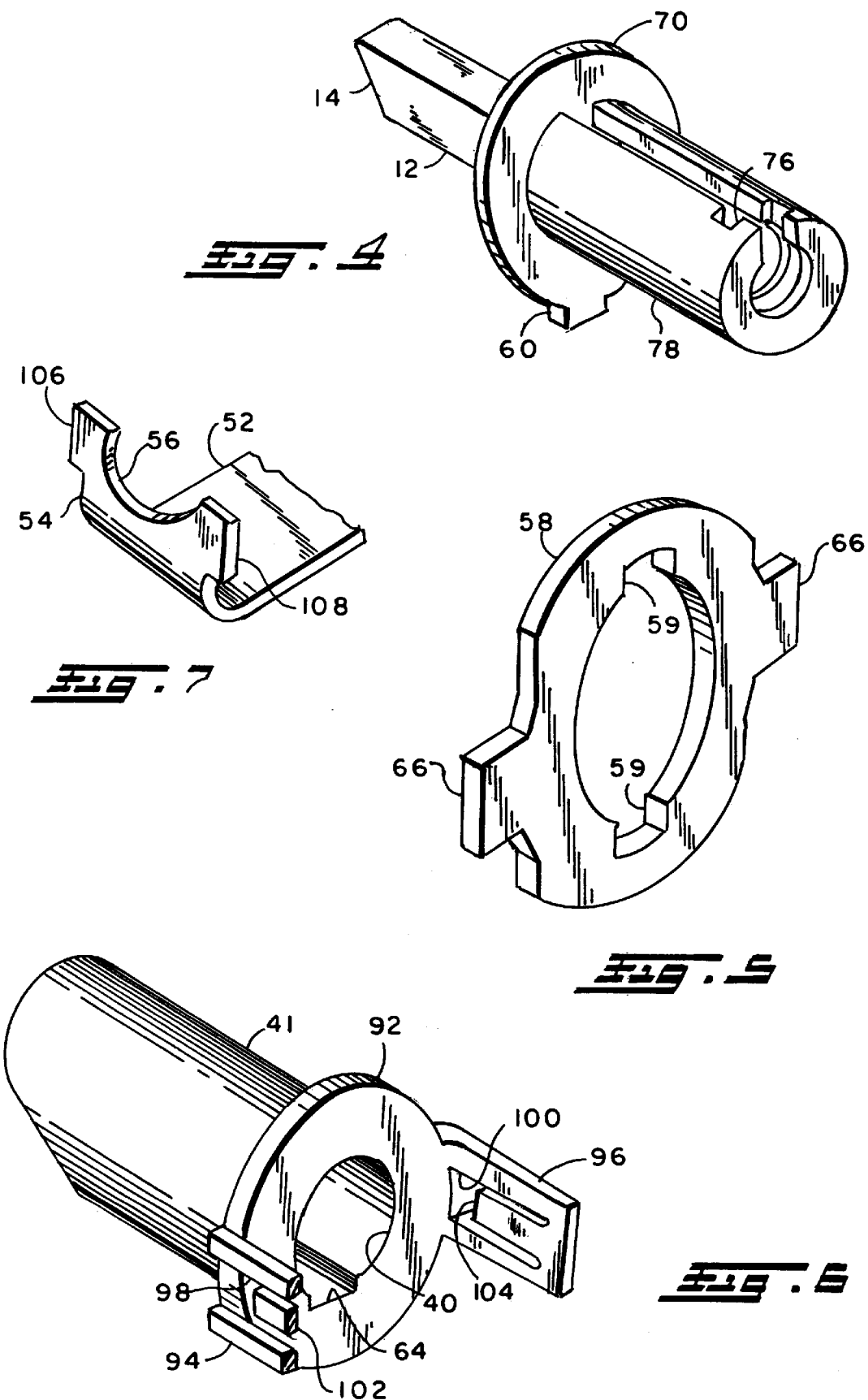

BI-STABLE SELF-ADJUSTING ACTUATOR MECHANISM

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to electrically operated actuator mechanisms and particularly relates to such mechanisms which employ an electromagnetic operator and which are suitable for use in automotive applications such as, for example, a locking/unlocking mechanism for a fuel filler access door.

In recent times, it has been desired to provide remote electrical control of the locking and unlocking of an automotive fuel filler access door and to combine such electrical control of the filler access door with a mechanical override unlocking function to permit opening of the access door, in the event of failure of any of the electrical components.

In providing a actuator mechanism which is remotely electrically operated, and particularly suitable locking and unlocking for an automotive fuel filler access door, it has been found difficult to provide for latching or holding of the mechanism in the energized actuator or unlocked state without the need to maintain electrical power to the mechanism. For example, if an actuator mechanism is spring biased to the locked position in the electrically de-energized state and is actuated and unlocked by electrical energization, it is thus necessary to maintain power to the electrical operator in order to maintain the mechanism in the unlocked state. For low voltage applications, such as encountered in on-board automotive power supplies, the electrical power necessary to overcome the bias spring force on the actuator bolt results in a prohibitively expensive electrical actuator where power is maintained to the actuator during the time that it is energized for unlocking.

In automotive fuel filler door latch applications, the variation in sheet metal component dimensions occurring during assembly of the vehicle body requires a wide latitude of adjustment of the latching mechanism for engagement of the actuator bolt member with the striker in order to secure the fuel filler access door in the closed position. Heretofore, it has been difficult to design an electrically operated remote locking/unlocking mechanism which could be readily assembled in mass production of automotive vehicles for the fuel filler access door application and which could accommodate a wide variation in position of the parts at assembly.

Thus, it has long been desired to provide a way or means of electrically remotely locking and unlocking a mechanism in a manner which enables the mechanism to be held or retained in the actuated or unlocked state without the need for maintaining electrical power to the operator. It has further been desired to provide such a mechanism which is capable of accommodating wide variations in the assembly of the latching member with a striker or retainer so as to permit low cost manufacturing and ease of assembly in high volume mass production. It has been particularly desired to provide such a remotely controlled electrically operated locking/unlocking mechanism for an automotive fuel filler access door application.

BRIEF SUMMARY OF THE INVENTION

It is an object of the present invention to provide a relatively low cost electrically operated remotely controlled actuator mechanism spring biased to the unactuated position and maintained in the actuated position after energization and de-energization of the electrical operator.

It is a further object of the present invention to provide the aforesaid type of remotely controlled electrically operated actuator for use as a latching bolt and to provide for a wide variation in location of the striker upon installation.

The present invention provides a solution to the above-described problem of enabling remote control of an electrically operating latching/unlatching mechanism such as one suitable for moving a bolt member against a striker for remotely locking and unlocking a door. In particular, the invention provides for remote control of an electromagnetically operated latching/unlatching mechanism having a bolt member moved in contact with a striker by a bias spring and unlocked or moved away from the striker by electrical energization of a solenoid. The operator includes a permanent magnet attached to a pole piece and coil which are slidably moveable on a base or housing. Upon energization the solenoid armature moves the bolt member to the unlocked position and maintains the mechanism in the unlocked position by force of the magnetic attraction. The electrical energization of the solenoid may then be discontinued and the bolt member is retained in the unlocked position without electrical power.

The unlocking is accomplished by energizing the solenoid with electrical current flow in one direction in the coil such that the pole piece is magnetized in a manner complementing the permanent magnet to provide sufficient force to overcome the force of the bias spring and move the armature to unlock the mechanism. Upon discontinuing of the electrical energization, the permanent magnet is sufficiently strong to retain the armature mechanism in the actuated or unlocking state. Upon energization of the coil with current flow in the opposite direction, the magnetization of the pole piece members opposes the magnetic poles of the permanent magnet and neutralizes the magnetic attraction of the magnet thereby permitting the bias spring to return the bolt member to its locking position.

The slidable mounting of the coil, pole piece bolt and magnet sub-assembly on the housing permits the bolt to be adjusted for the locked position so as to provide adequate stroke of the solenoid armature and bolt member upon electrical energization in a manner which can accommodate wide variation of the components encountered in the sheet metal assembly, particularly the variation encountered in the assembly of mass produced motor vehicles.

The present invention thus provides a low cost, self-positioning electromagnetic operator for providing remote electrical locking and unlocking of a mechanism and is particularly suitable for locking and unlocking of an automotive fuel filler access door.

BRIEF DESCRIPTION OF THE DRAWINGS

FIG. 3 is a view similar to FIG. 1 showing the solenoid in the unlocked condition and the open position of the door shown in dashed outline;

FIG. 4 is an axonometric view of the moveable actuator or latch bolt of the present invention;

FIG. 5 is an axonometric view of the pole frame spacer of the present invention;

FIG. 6 is an axonometric view of the moveable actuator member of the present invention; and, FIG. 7 is a view of a portion of the magnetic pole frame of the present invention.

DETAILED DESCRIPTION OF THE INVENTION

Figure 1:
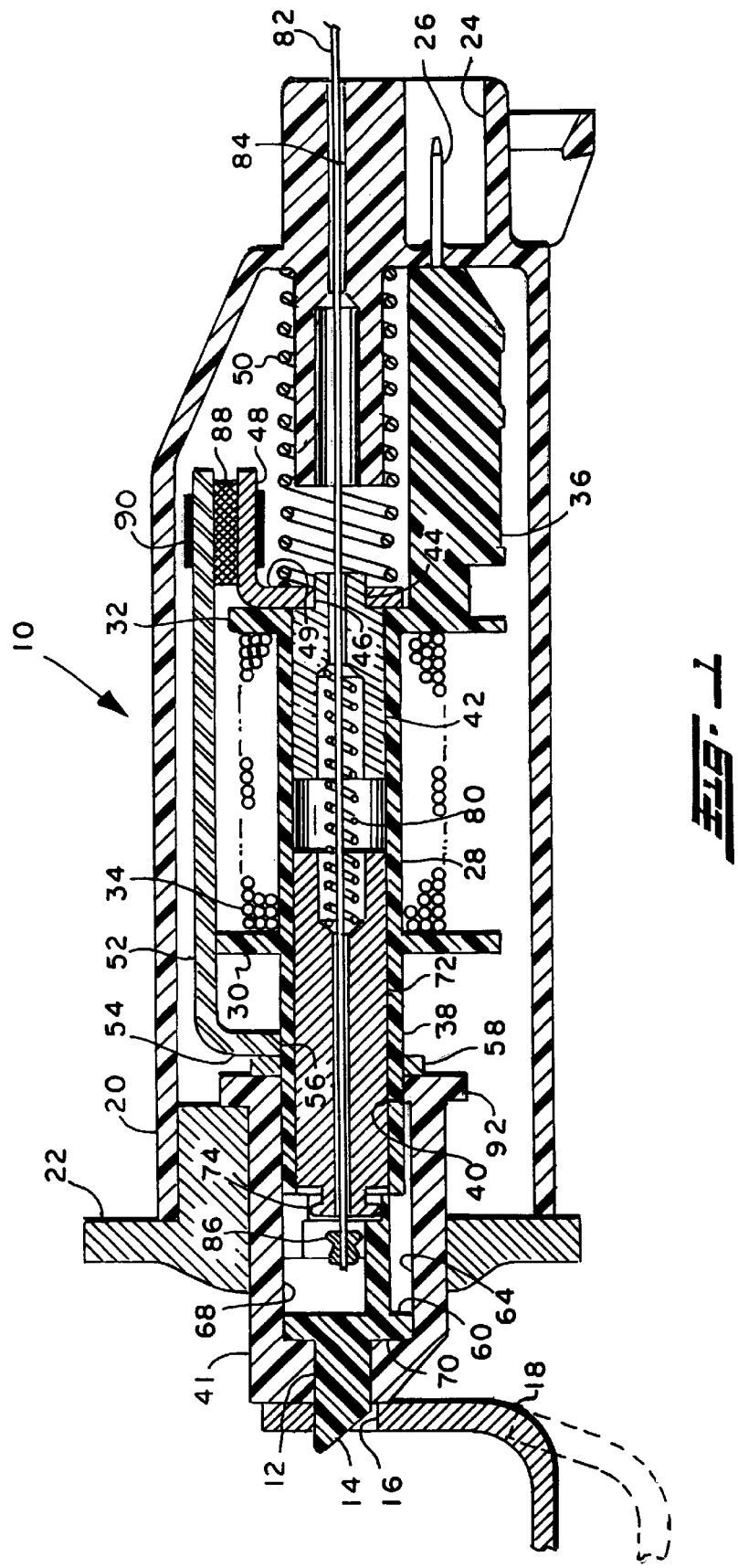
FIG. 1 is a cross-section view of the mechanism of the present invention in the de-energized condition.

Referring to FIG. 1, the actuator assembly of the present invention is indicated generally at 10 and is shown as having a moveable bolt member 12 having a striker surface 14. When the bolt 12 is in the extended position, the striker surface contacts the edge of the device to be locked indicated by reference numeral 18 which may be a hinged door as, for example, an automotive fuel filler access door. The door is moved or rammed against surface 14; and, the bolt is depressed rightwardly and slides along the surface of the door until engaging slot 16 in the door whereupon the bolt is spring biased into slot 16.

The housing 20 has an end member 22 which is adapted to be mounted on a suitable supporting structure (not shown) as for example the automobile body upon which the access door 18 is hinged. Housing 20 has an electrical receptacle 24 formed in an end thereof opposite end member 22. Receptacle 24 has provided therein at least one electrical connector terminal adapted external electrical connection thereto as, for example, by a wiring harness connector.

Housing 20 has disposed therein a generally tubular bobbin member 28 with a pair of spaced annular flanges 30, 32 provided thereon about which is wound a solenoid coil 34 of electrical conductor. Bobbin flange 32 has attached thereto an extension 36 which is anchored to housing 20 adjacent the electrical receptacle 24. The bobbin 28 has a tubular extension 38 extending axially outwardly from the flange 30. Referring to FIGS. 1 and 6 extension 38 has the end thereof received in and supported by counterbore 40 provided in a bolt guide member 41.

An annular pole piece 42 is slidably received in the right hand end of the bobbin 28 and has a reduced diameter portion 44 thereof engaging an aperture 46 formed in a first pole frame member 48. Member 48 has a generally right angular configuration with a flange 49 of the member 48 biased against the end of bobbin flange 32 by a compression spring 50 having one end registered against the member 48 with the opposite end registered against housing 20.

Referring to FIGS. 1 and 7, a second pole frame member 52 extends from member 48 along the coil and over flange 30 and has a right angle flange portion 54 configured to slidably register against the surface of bobbin extension 38 via sliding surface 56 provided on the end of flange 54. It will be understood that the surface 56 is generally semicircular in shape to conform to the curved surface of extension 38.

Referring to FIGS. 1 and 5, a pole frame spacer member 58 is provided between the flange 54 of pole frame member 52 and the right hand end of the bolt guide member 41. The spacer having a pair of oppositely disposed internal notches 59 into one of which is slidably received an orientation lug 60 provided on bolt member 62, which lug is registered in a slot 64 provided in the bolt guide member 41. Spacer 58 has a pair of oppositely disposed outwardly extending lugs 66 provided thereon which are adapted for engagement by portions of the bolt guide 41 as will hereinafter be described.

Referring to FIG. 6, the groove 64 formed in the bore 40 of bolt guide member 41 is illustrated in greater detail. Referring to FIGS. 1, 4 and 6, it will be understood that a flange 70 provided on bolt 12 is sized for being slidably received in bore 40 in the bolt guide member 41.

Referring to FIG. 1 an annular armature 72 is slidably disposed in the tubular extension 38 of the bobbin; and, armature 72 has a convolution or annular rib 74 formed on the end thereof remote from pole piece 42. The tubular extension 38 is received in the bore 40 of bolt guide member 41. The armature rib 74 is engaged in a groove 76 formed in the inner periphery of the bolt 12 on a cylindrical portion 78 thereof extending from flange 70 in a direction oppositely directed from the striker surface 14.

The armature 72 is biased in a direction away from pole piece 42 by a spring 80 disposed therebetween. The engagement of the armature rib 74 in groove 76 of bolt extension 78 thus causes movement of the bolt 12 with movement of the armature 72.

An emergency actuation cable 82 is received through a bore 84 formed in the housing; and, the cable extends through pole piece 42, armature 72 and outwardly through the left end of the armature with respect to FIG. 1. The end of the cable 82 has a retainer in the form of a ferrule 86 crimped over the end thereof to prevent withdrawal of the cable. It will be understood that leftward movement of the emergency pull-cable causes ferrule 86 to register against the left end of the armature 72; and, continued movement of the cable effects movement of the armature in a rightward direction until the right hand end of the armature 72 is in contact with the left end of pole piece 42. This rightward movement of the armature by cable 82 retracts bolt 12 from door aperture 16.

A permanent magnet 88 is disposed between the end of pole frame member 48 and the end of pole frame member 52 and is secured therebetween by an annular clamping band 90, which in the presently preferred practice comprises heat shrink tubing.

Referring to FIG. 6, the bolt guide 41 has an annular outward extending flange 92 formed on one end thereof which flange has disposed on opposite sides thereof a pair of axially extending lugs 94, 96 each of which has a slot formed therein denoted respectively 98, 100 with integrally formed spring tabs 102, 104 extending therein.

In assembly, the spacer 58 is assembled over the extension 78 of the bolt and registered against the face of flange 70 with projection 60 of the spacer 58 aligned with one of the slots 59. The cable 82 is then assembled through armature 72; and, the rib 74 of the armature is engaged in groove 76 of the bolt 12. The spring 80 is received over the cable; and, the cable is fed through pole piece 42 and bore 84 in the housing to extend externally thereof for a suitable distance to provide the desired remote emergency actuation.

Referring to FIGS. 1, 4, 5, 6 and 7 the washer 58 is then assembled over portion 78 of the bolt and is registered against the face of flange 70 such that the extension 60 is aligned with a notch 59. The bolt 12 is then received in the bolt guide 41 with the projection 60 engaged in slot 64. The spring tabs 102, 104 are then engaged over suitable surfaces such as tabs 106, 108 provided on opposite sides of flange 54 of pole frame 52.

The extension 66 on the spacer 58 extend through the slots 98, 100 formed in the projections 94, 96 on the bolt guide 41.

Referring to FIG. 1, the actuator assembly is illustrated in the locked condition in solid outline which bolt 12 has engaged the slot 16 in the door 18 to be locked; and, the door is shown in dashed outline in the open position. In the condition illustrated in FIG. 1, coil 34 is de-energized and the bias force of spring 80 is sufficient to move the armature 72 and bolt 12 leftward until the flange 70 on the bolt is registered against the end of bore 40 in guide 41. In the actuator condition shown in FIG. 1, the door 18 is positioned with respect to housing 22 such that cover 52, spacer 58, pole frame member 52, magnet 88, pole frame piece 48 and pole piece 42 are moved leftward by the bias force of spring 50 to a position where the flange 92 on cover 62 has reached the leftward limit of its movement. In the position shown in FIG. 1, the flange 49 of pole frame member 48 is registered against the right hand end face of bobbin flange 32 under the urging of spring 50.

Figure 2:
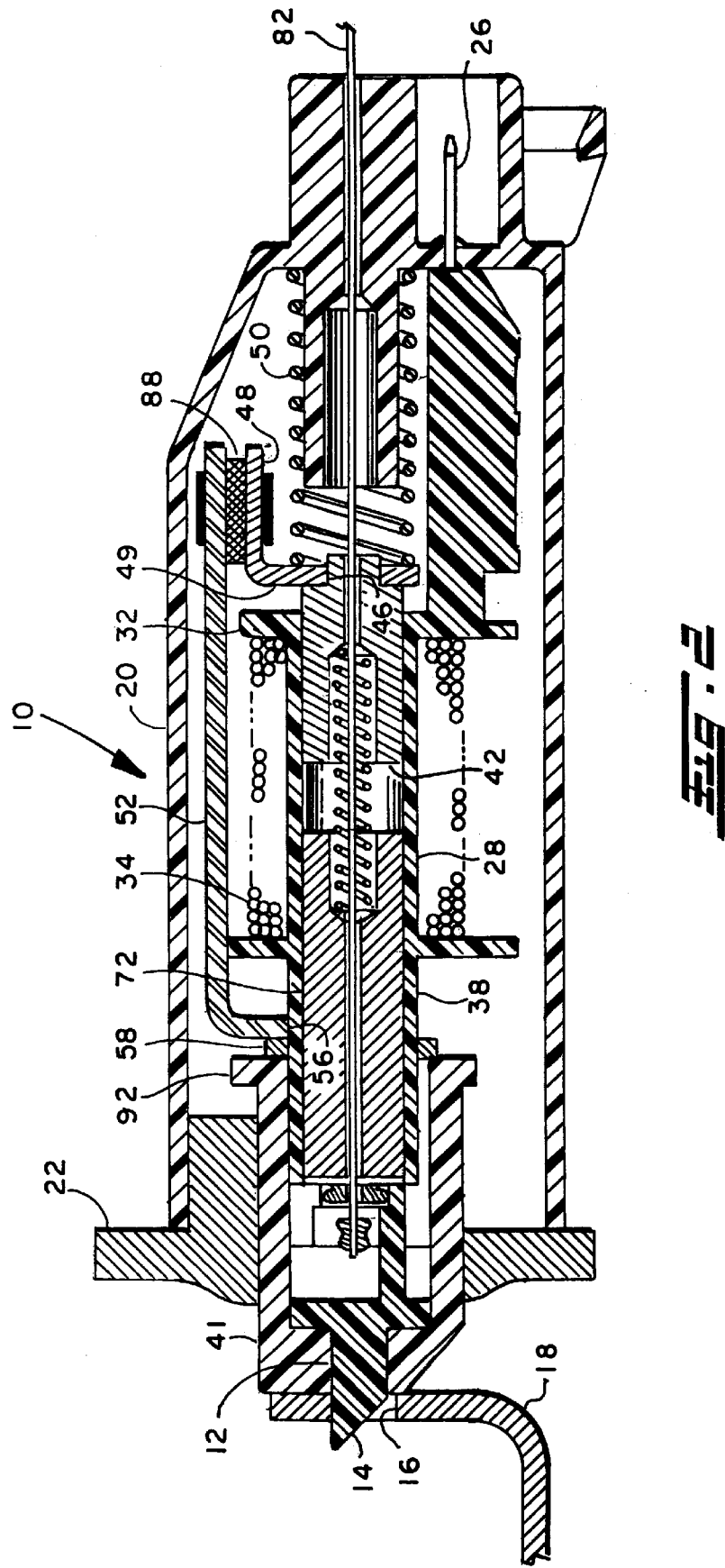
FIG. 2 is a view similar to FIG. 1 showing the mechanisms in the de-energized state with the pole frame and moved to accommodate assembly/installation dimensional variations.

Referring to FIG. 2, the actuator assembly 10 is shown installed in a position where the door 18 is spaced slightly closer to end member 22; and, with the end of bolt guide 41 registered against door 18, the end flange 92 of guide 41 is moved further away from the right hand end of end member 22. In the position shown in FIG. 2, the flange 49 of pole frame member 48 is spaced from the end face of bobbin flange 32 by a corresponding amount as shown by the space therebetween in FIG. 2. Thus, the pole frame, magnet and bolt guide as a subassembly is slidably moveable on the tubular extension 38 of the bobbin to accommodate during assembly, variations in the location of the door 18 with respect to the end 22 of the housing assembly.

Referring to FIG. 3, the actuator assembly 10 is shown in the coil energized or unlocked and latched condition in which the magnetic force of attraction of the solenoid coil 34 has added to the magnetic force of attraction of magnet 88 and caused the armature 72 to move rightward to contact the end of pole piece 42 and register thereagainst. The armature thus has moved bolt 12 rightward and disengaged the bolt from slot 16. When the coil is subsequently de-energized, the magnetic force of attraction of magnet 88 in the pole frame members 52, 48 is sufficient to hold the armature 72 against pole piece 42 and maintain the bolt 12 latched into the unlocked position permitting the door 18 to be moved from the position shown in solid outline FIG. 3 to the position shown in dashed outline in FIG. 3 for opening the door.

Subsequently, upon energization of coil 34 such that current flows in a direction opposite to that required to move the armature 72 rightward, the force of magnet 88 is neutralized by the magnetic field of the coil 34; and, the spring 80 is operative to bias the armature leftward to return it to the position shown in FIGS. 1 or 2 thus re-engaging bolt 12 with the door slot 16.

The present invention thus provides a unique and novel electrically operated actuator assembly which is magnetically latched in the unlocked position by a permanent magnet upon coil energization by current flow in one direction. Upon re-energization with current flow in the opposite direction in the coil, the magnet is neutralized to permit the return spring to re-engage the bolt. The subassembly of the pole frame, magnet and bolt is slidably moveable on the coil bobbin to permit the bolt guide to accommodate variations in location of the bolt guide with respect to the door or article to be engaged.

Although the invention has hereinabove been described with respect to the illustrated embodiments, it will be understood that the invention is capable of modification and variation and is limited only by the following claims.

We claim:

1. A bi-stable solenoid actuator assembly comprising:
   (a) a base having thereon a solenoid coil defining a central cavity therein;
   (b) a pole frame for completing a flux loop exteriorly about said coil and including a first and second member cooperating to form a generally "C" shaped configuration for completing a flux loop about the coil, said pole frame moveably mounted on said base for movement axially with respect to said coil and including a pole piece disposed in one end of said coil cavity;
   (c) means biasing said pole frame and said armature in a direction to contact a stop provided on said base;
   (d) a permanent magnet mounted on said pole frame;
   (e) an armature slidably disposed in said coil cavity and moveable between a first position defining a working air gap with said pole piece and a second position closing said air gap;
   (f) a bolt member coupled to said armature and moveable therewith for effecting a work function; and,
   (g) means for biasing said armature to said first position, wherein upon energization and flow of current in said coil in one direction, said armature is moved to said second position, and upon de-energization of said coil, said armature is latched in said second position by the attractive force of said magnet, and upon energization and flow of current in said coil in a direction opposite said one direction, the magnetic force of said magnet is overcome and said means for biasing returns said armature to said first position.

2. The assembly defined in claim 1, wherein said pole frame includes a first and second member and has a generally "C"-shaped configuration and has a pair of spaced parallel tabs extending therefrom with said magnet disposed between said tabs.

3. The assembly defined in claim 1, wherein said pole frame includes a first and second member having said magnet sandwiched intermediate portions thereof.

4. The assembly defined in claim 1, wherein said pole frame comprises first and second members having said magnet disposed intermediate portions thereof and retained therebetween by an elastic member.

5. The assembly defined in claim 4, wherein said elastic member comprises heat shrink tubing.

6. The assembly defined in claim 1, wherein said bolt member is slidably disposed with respect to said base.

7. The assembly defined in claim 1, further comprising a pull member associated with said armature, said pull member extending through said pole piece member and outwardly of said housing, said pull member operable upon user movement to effect movement of said armature without coil energization.

8. A method of electrically unlocking an actuator mechanism:
   (a) providing a locking bolt and spring biasing said locking bolt to a closed position on a housing;
   (b) providing a solenoid having a stationary coil and moveable armature and a pole frame and coupling the locking bolt to the solenoid armature and energizing the coil in one direction and moving the locking bolt to an unlocked position;
   (c) de-energizing the coil and latching the locking bolt in the unlocked position with a magnet;
   (d) energizing the coil in a direction opposite said one direction and neutralizing the magnet; and,
   (e) disposing said magnet on said pole frame and moving the pole frame and locking bolt with respect to the coil and locating the locking bolt for locking.

* * * * *